United States Patent
Nakamura et al.

(10) Patent No.: US 10,136,397 B2
(45) Date of Patent: Nov. 20, 2018

(54) BASE STATION APPARATUS AND TERMINAL APPARATUS

(71) Applicant: Sharp Kabushiki Kaisha, Sakai, Osaka (JP)

(72) Inventors: Osamu Nakamura, Sakai (JP); Jungo Goto, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/543,017

(22) PCT Filed: Jan. 14, 2016

(86) PCT No.: PCT/JP2016/051011
§ 371 (c)(1),
(2) Date: Jul. 12, 2017

(87) PCT Pub. No.: WO2016/114359
PCT Pub. Date: Jul. 21, 2016

(65) Prior Publication Data
US 2018/0035390 A1 Feb. 1, 2018

(30) Foreign Application Priority Data
Jan. 14, 2015 (JP) .................. 2015-004610

(51) Int. Cl.
H04W 52/26 (2009.01)
H04B 1/04 (2006.01)
(Continued)

(52) U.S. Cl.
CPC ............ *H04W 52/262* (2013.01); *H04B 1/04* (2013.01); *H04J 11/00* (2013.01);
(Continued)

(58) Field of Classification Search
USPC ............................................. 455/522, 69–70
See application file for complete search history.

(56) References Cited

U.S. PATENT DOCUMENTS 9,438,282 B2   9/2016   Kishiyama et al.
2004/0049725 A1   3/2004   Golitschek et al.
(Continued)

FOREIGN PATENT DOCUMENTS

JP   2013-009288 A   1/2013
JP   2013-009289 A   1/2013
(Continued)

OTHER PUBLICATIONS

Sharp: "Constellation mapping enhancements for downlink multiuser superposition transmission", 3GPP Draft; R1-151711, 3rd Generation Partnership Project (3GPP), Mobile Competence Centre; 650, Route Des Lucioles; F-06921 Sophia-Antipolis Cedex; France, vol. Ran WG1, No. Belgrade, Serbia; Apr. 20, 2015-Apr. 24, 2015, Apr. 10, 2015 (Apr. 10, 2015), XP050949613, Retrieved from the Internet: URL:http://www.3gpp.org/ftp/tsg_ran/WG1_RL1/TSGR1_80b/Docs/ [retrieved on Apr. 10, 2015].

*Primary Examiner* — Fayyaz Alam
(74) *Attorney, Agent, or Firm* — ScienBiziP, P.C.

(57) ABSTRACT

In downlink non-orthogonal access, favorable transmission characteristics are achieved without significantly increasing the amount of control information. A base station apparatus includes a first modulation symbol generation unit which generates a first modulation symbol, a second modulation symbol generation unit which generates a second modulation symbol in consideration of a bit sequence configuring the first modulation symbol, a power assignment unit which assigns different transmit powers to the first modulation symbol and the second modulation symbol, and a signal addition unit which adds the first modulation symbol and the second modulation symbol.

4 Claims, 15 Drawing Sheets

(51) Int. Cl.
  *H04J 11/00* (2006.01)
  *H04L 27/00* (2006.01)
  *H04W 28/02* (2009.01)
  H04L 5/00 (2006.01)
  H04W 28/06 (2009.01)

(52) U.S. Cl.
  CPC ...... H04L 27/0008 (2013.01); H04L 27/0012 (2013.01); H04W 28/0215 (2013.01); *H04L 5/005* (2013.01); *H04W 28/06* (2013.01)

(56) References Cited

U.S. PATENT DOCUMENTS

| | | |
|---|---|---|
| 2014/0029562 A1 | 1/2014 | Kishiyama et al. |
| 2014/0086372 A1 | 3/2014 | Kishiyama et al. |
| 2015/0171983 A1* | 6/2015 | Kusashima ............ H04J 11/004 370/329 |
| 2016/0336981 A1 | 11/2016 | Kishiyama et al. |

FOREIGN PATENT DOCUMENTS

| | | |
|---|---|---|
| JP | 2013-048354 A | 3/2013 |
| JP | 2013-247513 A | 12/2013 |
| WO | 0139454 A1 | 5/2001 |

* cited by examiner

BASE STATION APPARATUS AND TERMINAL APPARATUS

TECHNICAL FIELD

The present invention relates to base station apparatuses and terminal apparatuses.

BACKGROUND ART

With widespread adoption of smartphones and tablet terminals in recent years, wireless traffics are sharply increasing. To address a surge in traffic, fifth-generation mobile communication systems (5G) have been studied and developed.

In a long term evolution (LTE) or LTE-advanced (LTE-A) downlink, an access scheme (orthogonal multi-access) called orthogonal frequency division multiple access (OFDMA) is used, in which many narrow-band carriers (sub-carriers) are mapped so as to be orthogonal. By contrast, as an access technique for 5G, non-orthogonal multi-access technology has been studied much. In non-orthogonal multi-access, assuming that reception process such as interference canceller at a receiver, maximum likelihood estimation, or the like is performed, a non-orthogonal signal is transmitted. As of non-orthogonal multi-accesses targeted for downlinks, downlink non-orthogonal multiple access (DL-NOMA) has been suggested (PTL 1 and PTL 2). In DL-NOMA, at a base station apparatus (also called evolved node B (eNB) or base station), modulation symbols to a plurality of different terminal apparatuses (also referred to as user equipment (UE), mobile station apparatuses, mobile stations, or terminals) are added (superposition coding) for transmission. Here, transmit power to be assigned to each modulation symbol is determined in consideration of received power (reception quality), a modulation and coding scheme (MCS: modulation scheme and coding rate), or the like at a terminal apparatus for multiplexing. Among multiplexed transmit signals, the terminal apparatus decodes a signal to another terminal apparatus, and generates a replica of the signal to the other terminal apparatus, and cancels the replica from the received signal, thereby allowing only a modulation symbol to a local terminal to be extracted.

CITATION LIST

Patent Literature

PTL 1: Japanese Unexamined Patent Application Publication No. 2013-9288
PTL 2: Japanese Unexamined Patent Application Publication No. 2013-9289

SUMMARY OF INVENTION

Technical Problem

In DL-NOMA, since demodulation and decoding have to performed on the signal to the other terminal, the terminal for which cancellation is to be performed has to be notified of, in addition to the MCS of that terminal apparatus, the MCS of the signal to the other terminal. With this, if the MCS and assignment information of the other terminal to multiplexed by DL-NOMA are notified other than the MCS of each terminal, there is a problem in which the amount of control information for the downlink is increased, and the amount of information data that can be transmitted on the downlink is decreased.

The present invention was made in view of these circumstances, and has an object of providing, in a DL-NOMA system, a system capable of improving performance of DL-NOMA without increasing control information.

Solution to Problem

The terminal apparatus and the base station apparatus according to the present invention to solve the above-described problems are as follows.

(1) A base station apparatus of the present invention includes a first modulation symbol generation unit which generates a first modulation symbol, a second modulation symbol generation unit which generates a second modulation symbol in consideration of a bit sequence configuring the first modulation symbol, a power assignment unit which assigns different transmit powers to the first modulation symbol and the second modulation symbol, and a signal addition unit which adds the first modulation symbol and the second modulation symbol.

(2) Also, in the base station apparatus of the present invention, the power assignment unit assigns power to the second modulation symbol higher than power to the first modulation symbol.

(3) Also, in the base station apparatus of the present invention, the first modulation symbol generation unit performs modulation equal to or higher than a modulation order of the second modulation symbol.

(4) Also, in the base station apparatus of the present invention, the first modulation symbol generation unit divides a configuration bit sequence of the second modulation symbol into two, and changes labeling by an exclusive OR of the divided bit sequence.

(5) Also, in the base station apparatus of the present invention, the first modulation symbol generation unit changes labeling on an in-phase axis by an exclusive OR of a former half of the bit sequence of the divided bit sequence, and changes labeling on an orthogonal axis by an exclusive OR of a latter half of the bit sequence of the divided bit sequence.

(6) Also, in the base station apparatus of the present invention, the changing of the labeling is achieved by interchanging positive and negative.

(7) Also, a terminal apparatus of the present invention includes a receive antenna which receives a signal with a first modulation symbol and a second modulation signal added thereto and a demodulation processing unit which performs demodulation process on the added signal, in which labeling of the first modulation symbol is changed by a configuration bit sequence of the second modulation symbol, and the demodulation processing unit performs the demodulation process in consideration of the changed labeling.

Advantageous Effects of Invention

According to the present invention, the performance of DL-NOMA can be enhanced without increasing the amount of control information, thereby making it possible to improve cell throughput or user throughput.

BRIEF DESCRIPTION OF DRAWINGS

FIG. 15 is a diagram depicting a non-orthogonal-multiplexed signal point constellation according to the second embodiment.

DESCRIPTION OF EMBODIMENTS

First Embodiment

A communication system in the present embodiment includes at least one base station apparatus (transmission apparatus, cell, transmission point, transmit antenna group, transmit antenna port group, component carrier, evolved node B (eNB)) and a plurality of terminal apparatuses (terminals, mobile terminals, reception points, reception terminals, reception apparatuses, receive antenna groups, receive antenna port groups, user equipment (UE)).

Figure 1:
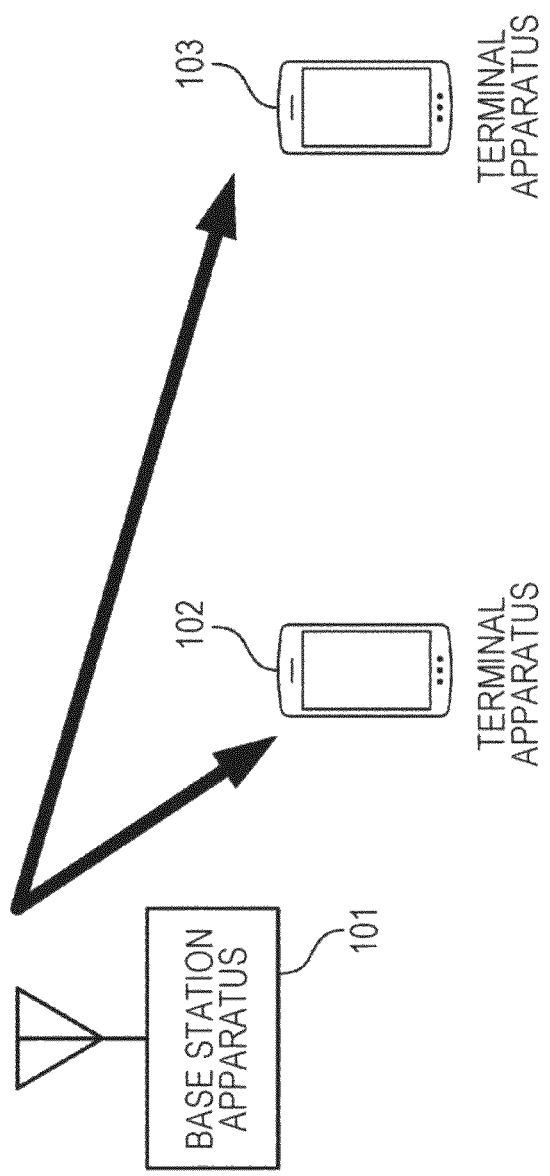
FIG. 1 is a diagram depicting one example of communication system.

FIG. 1 is a schematic diagram depicting one example of a downlink (forward link) of a cellular system according to a first embodiment of the present invention. In the cellular system of FIG. 1, one base station apparatus (eNB) 101 is present, and a terminal apparatus 102 and a terminal apparatus 103 to be connected to the base station apparatus 101 are present. The base station apparatus 101 multiplexes signals to the terminal apparatus 102 and the terminal apparatus 103 for transmission with the same sub-carrier.

Figure 2:
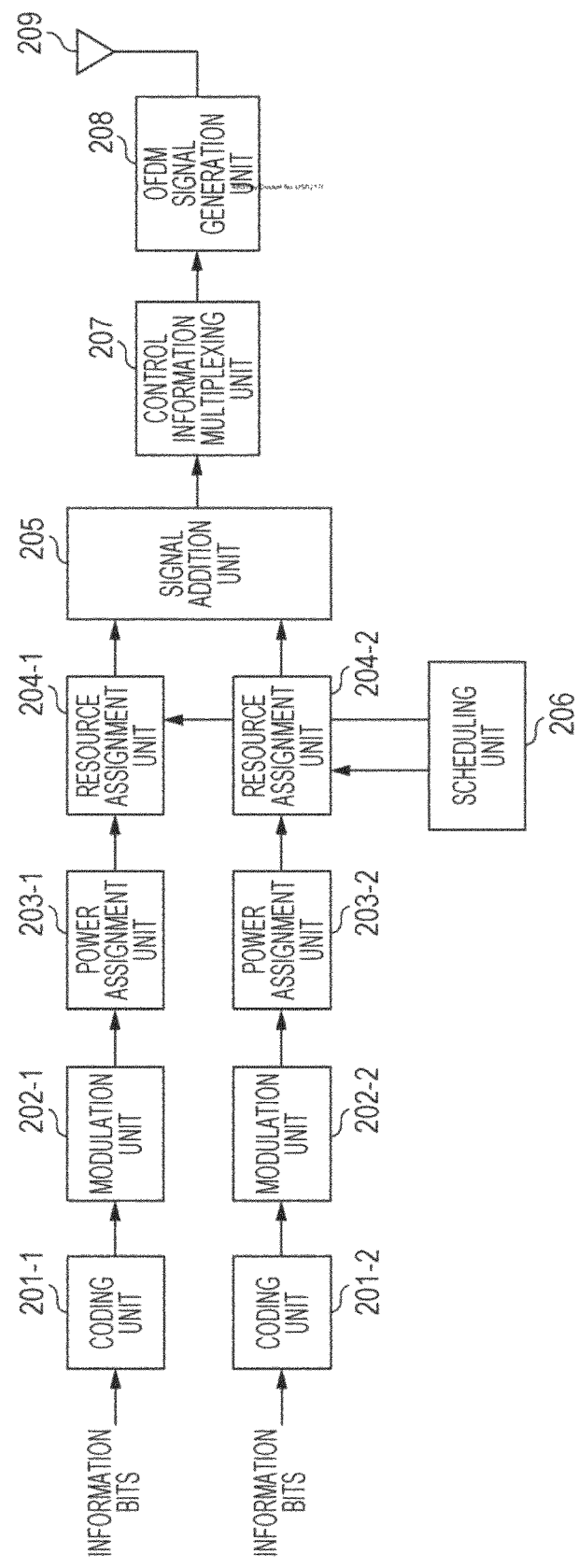
FIG. 2 is a diagram depicting a conventional example of the structure of a transmitter of a base station apparatus.
Figure 3:
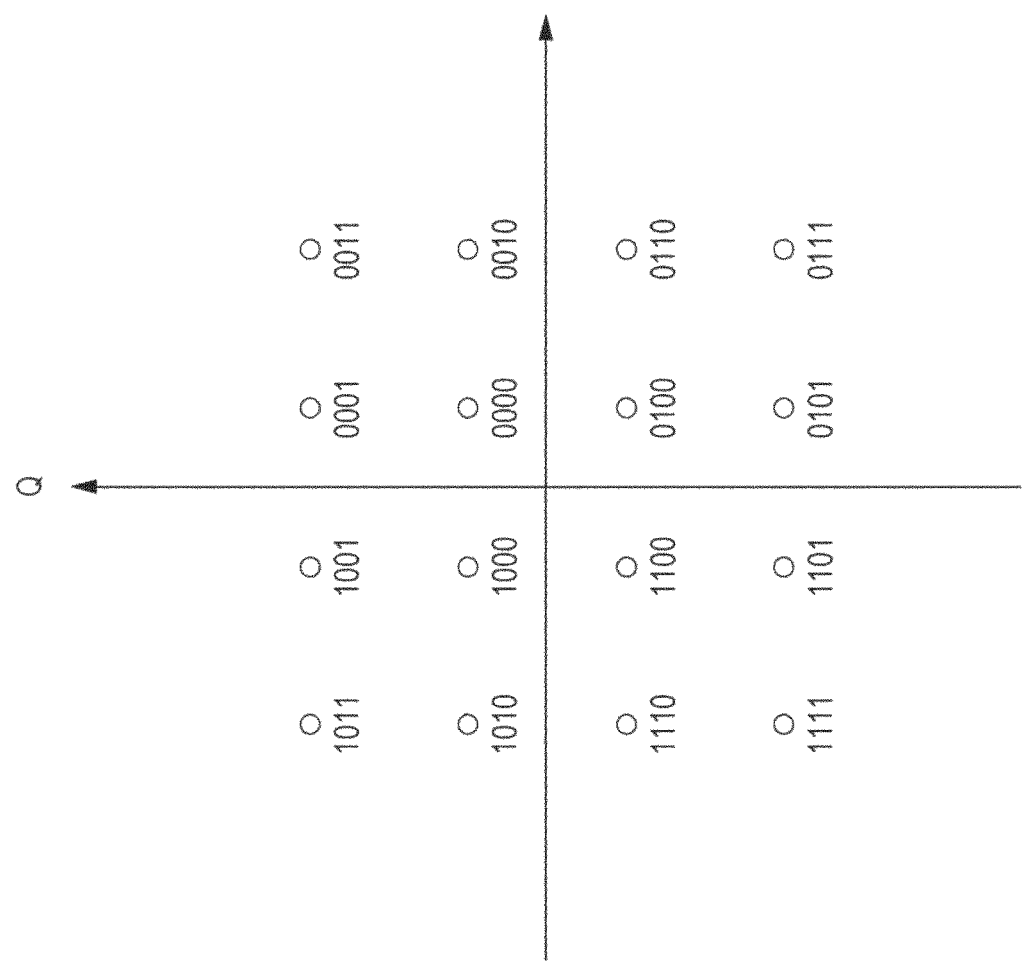
FIG. 3 is a diagram depicting a signal point constellation of 16 QAM.
Figure 4:
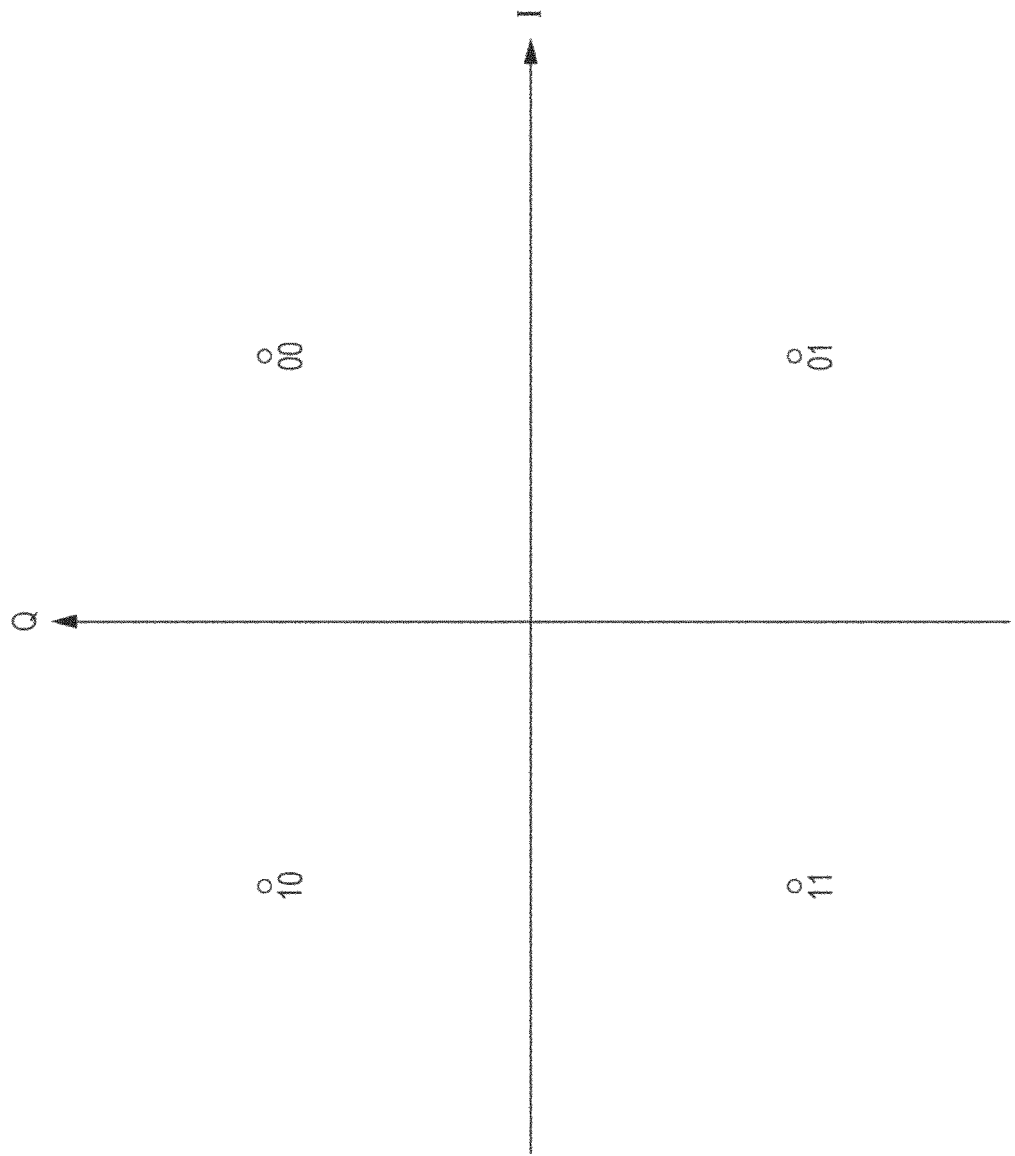
FIG. 4 is a diagram depicting a signal point constellation of QPSK.

FIG. 2 is a block diagram depicting one example of the structure of a transmitter of a conventional base station apparatus 101 which performs DL-NOMA. In FIG. 2, the number of signals to be multiplexed is assumed to be 2. Information bits are inputted to a coding unit 201-1 and a coding unit 201-2, where error correction coding is applied. Note that which coding rate is to be used in error correction coding is determined based on, for example, information about MCS inputted from a scheduling unit 206. Also, at the coding unit 201-1 and the coding unit 201-2, process capable of improving effects of error correction such as bit interleave may be performed. Error-correction coded bits are inputted to a modulation unit 202-1 and a modulation unit 202-2, respectively, where process of transforming a bit sequence to a modulation symbol sequence is performed. Here, the generated modulation symbol is of quadrature phase shift keying (QPSK), 16 quadrature amplitude modulation (QAM), 64 QAM, or the like, and different modulation schemes may be used between the modulation unit 202-1 and the modulation unit 202-2. Note that which modulation scheme is to be used is determined based on information about MCS inputted from the scheduling unit 206, for example. For example, when the modulation scheme applied at the modulation unit 202-1 is 16 QAM, of modulation symbol candidate points depicted in FIG. 3, any one of the points is transmitted depending on the transmission bit sequence. Note that a numeral accompanying a signal candidate point of FIG. 3 represents a bit sequence for configuring that signal candidate point, and the I axis represents in-phase components, and the Q axis represents orthogonal components. Similarly, also when the modulation scheme applied at the modulation unit 202-2 is QPSK, of modulation symbol candidate points depicted in FIG. 4, any one of the points is transmitted. Here, each terminal apparatus is notified of information about MCS in each terminal apparatus via a control information channel.

Outputs from the modulation unit 202-1 and the modulation unit 202-2 are inputted to a power assignment unit 203-1 and a power assignment unit 203-2, respectively. In the power assignment unit 203-1 and the power assignment unit 203-2, power assignment is performed so that a total value of average powers of the outputs from the modulation unit 202-1 and the modulation unit 202-2 is a predetermined value. This power assignment is determined advance or determined in consideration of cell throughput, user throughput, or the like at the scheduling unit 206, and is performed based on values inputted to the power assignment unit 203-1 and the power assignment unit 203-2. Outputs from the power assignment unit 203-1 and the power assignment unit 203-2 are inputted to resource assignment units 204-1 and 204-2, respectively. At the resource assignment unit 204-1 and the resource assignment unit 204-2, signals inputted from the power assignment unit 203-1 and the power assignment unit 203-2 are each mapped to a predetermined sub-carrier in accordance with assignment information inputted from the scheduling unit 206.

Figure 5:
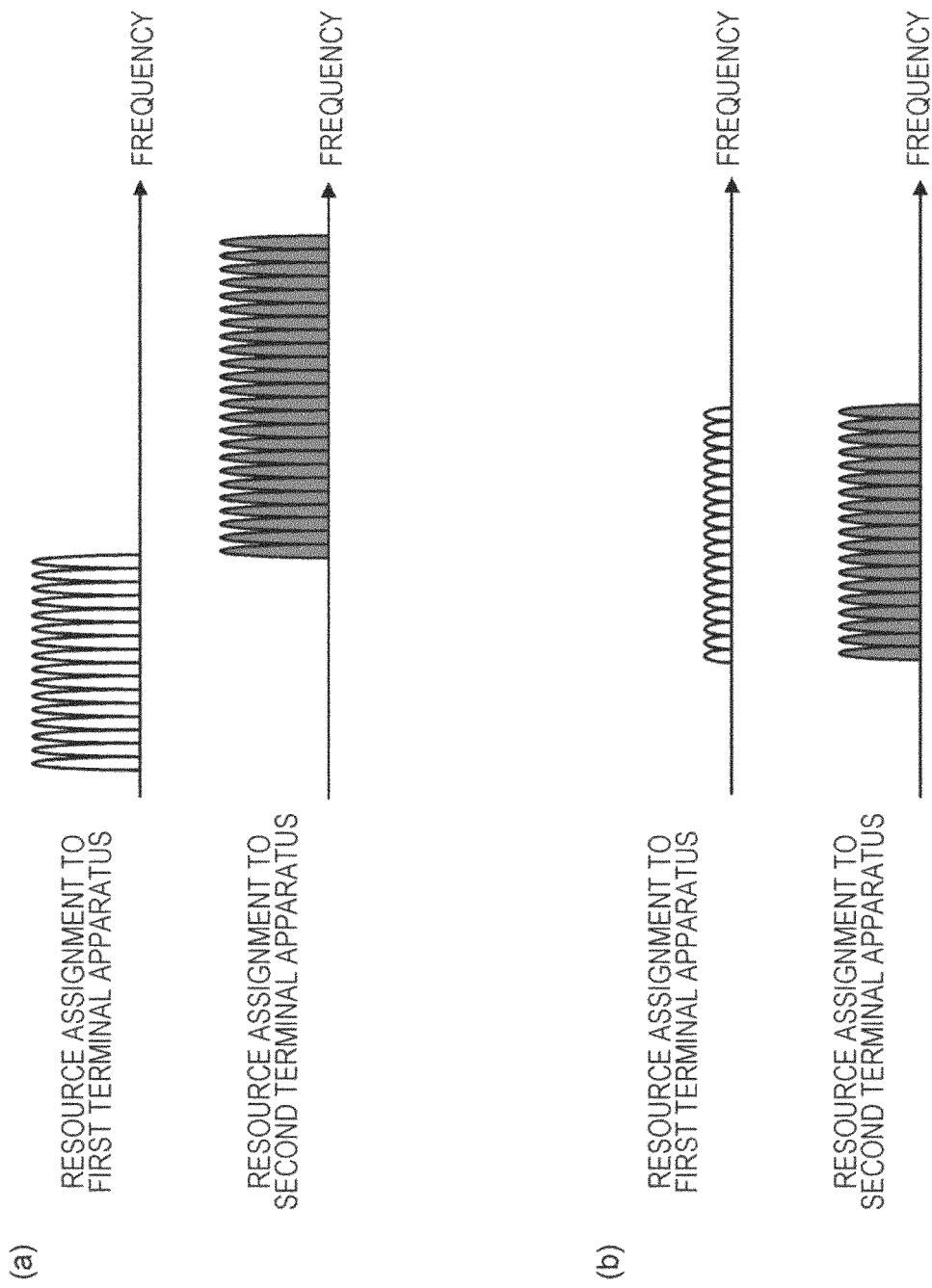
FIG. 5 is a conventional example of resource assignment to each terminal apparatus.
Figure 6:
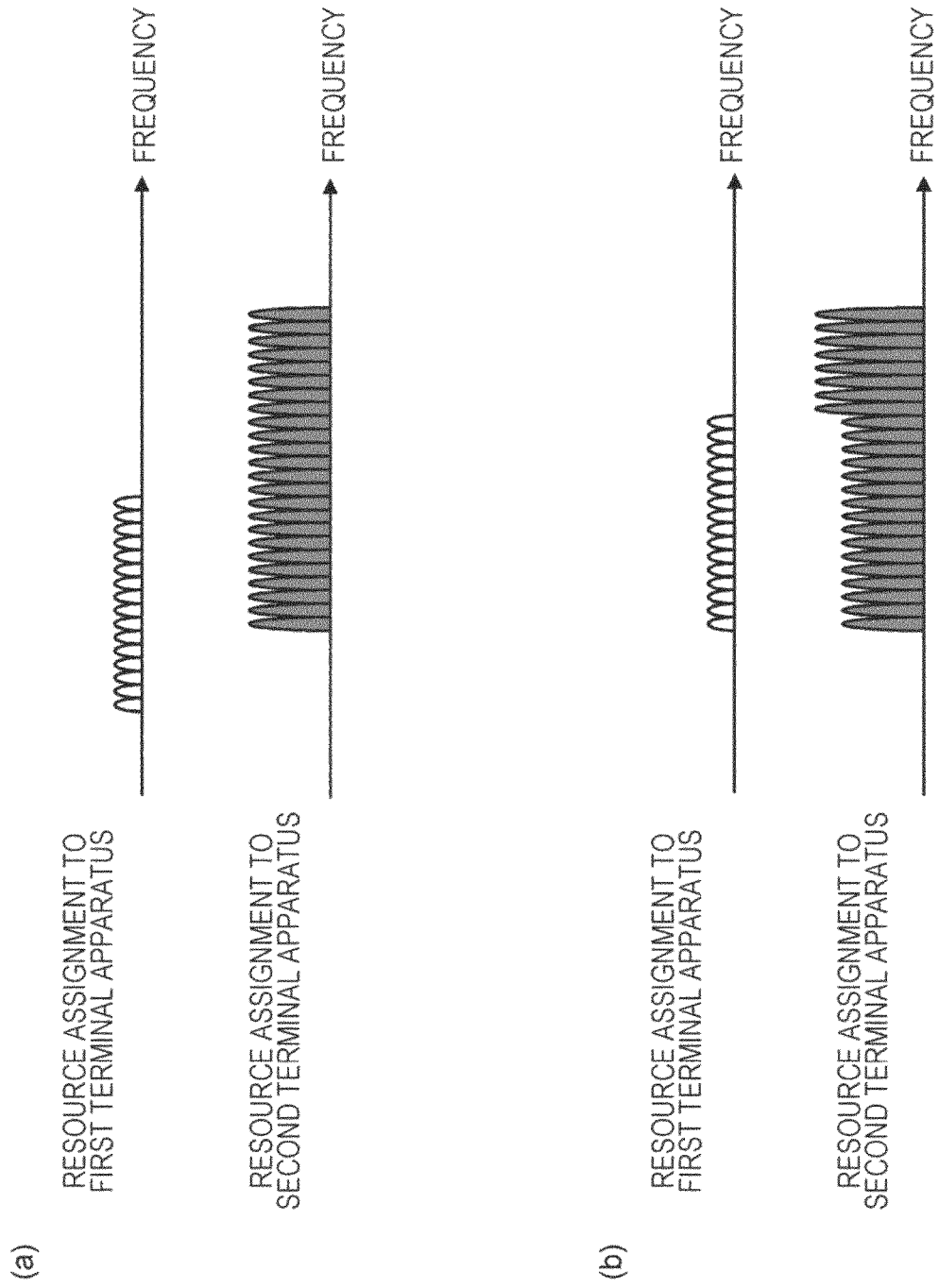
FIG. 6 is a diagram depicting one example of resource assignment in which non-orthogonal multiplexing is performed in part of a band.

Next, the scheduling unit 206 is described. When so-called orthogonal multi-access is performed instead of DL-NOMA, the scheduling unit 206 determines resource assignment so that the resource assignment units 204-1 and 204-2 each use a different resource. For example, resource assignment is made to each terminal apparatus as depicted in FIG. 5(a). That is, resources used by the resource assignment units 204-1 and 204-2 do not overlap each other. On the other hand, to perform non-orthogonal multi-access disclosed in PTL 1 and PTL 2, the resource assignment units 204-1 and 204-2 perform the same resource assignment. For example, resources are assigned to each terminal apparatus, as depicted in FIG. 5(b). As a result, signals outputted from the power assignment unit 203-1 and the power assignment unit 203-2 are transmitted by sharing the same wireless resource. On the other hand, in the present embodiment, the resource assignment units 204-1 and 204-2 assign, to each terminal apparatus, not only exactly the same resources or resources not overlapping each other but also resources, for example, as depicted in FIG. 6(a) or FIG. 6(b). That is, according to the present embodiment, resources can be assigned so that part of the assigned resources overlap. The reason why such resource assignment can be performed will be described further below. Note that as power assignment at the power assignment unit 203-1 and the power assignment unit 203-2, as depicted in FIG. 6(a) and FIG. 6(b), the same power may be assigned in all of a plurality of sub-carriers to be used for signals to the respective terminal apparatuses, or power may be changed for each sub-carrier depending on whether non-orthogonal multiplexing has been performed, the number of times of non-orthogonal multiplexing, or the like.

Figure 7:
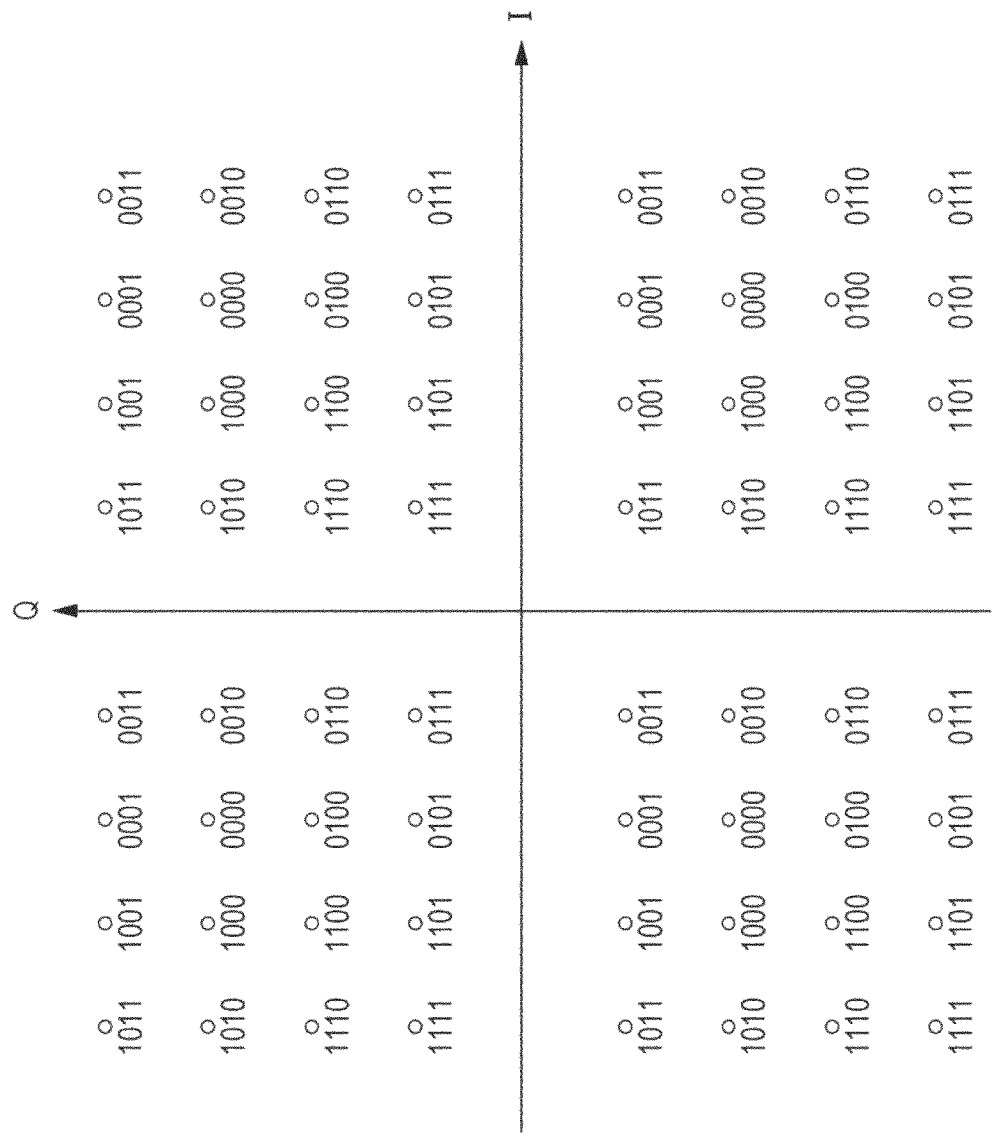
FIG. 7 is a diagram depicting a signal point constellation of non-orthogonal multiplexing.
Figure 8:
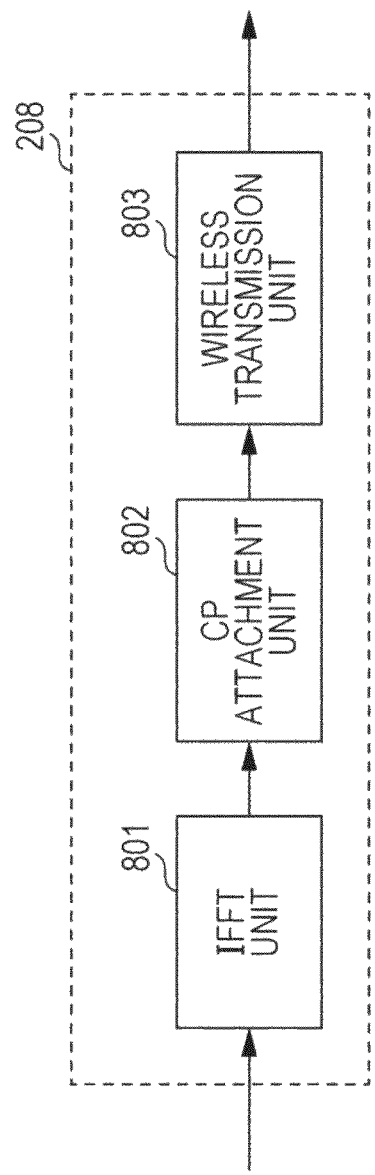
FIG. 8 is a diagram depicting one example of an OFDM signal generation unit.

Outputs from the resource assignment units 204-1 and 204-2 are inputted to a signal addition unit 205. At the signal addition unit 205, the outputs from the resource assignment units 204-1 and 204-2 are added (combined; superposition coding) for each sub-carrier. When part or all of the assigned resources at the resource assignment units 204-1 and 204-2 overlap, non-orthogonal multiplexing by superimposing (superposition coding) is performed at that resource (sub-carrier). For example, when the modulation scheme applied at the modulation unit 202-1 is 16 QAM and the modulation scheme applied at the modulation unit 202-2 is QPSK, the signal addition unit 205 transmits any one of the points in a signal point constellation as depicted in FIG. 7. Note that labeling in FIG. 7 represents only bit sequences to be transmitted to a terminal apparatus by 16 QAM. An output from the signal addition unit 205 is inputted to a control information multiplexing unit 207. At the control information multiplexing unit 207, process of multiplexing control information and so forth for reception process at the terminal apparatus is applied. Here, as the control information, MCS, assignment information, and so forth are included. An output from the control information multiplexing unit 207 is inputted to an OFDM signal generation unit 208. The structure of the OFDM signal generation unit 208 is depicted in FIG. 8. As depicted in FIG. 8, the output from the control information multiplexing unit 207 is inputted to an IFFT unit 801, where transformation from a frequency domain signal to a time domain signal is performed by inverse fast Fourier transform (IFFT). An output from the IFFT unit 801 is inputted to a CP attachment unit 802, where a cyclic prefix (CP) is attached in order to acquire tolerance to delay waves. An output from the CP attachment unit 802 is inputted to a wireless transmission unit 803, where process such as digital to analog (D/A) conversion, band-limiting filtering, up-conversion, or the like is applied. An output from the wireless transmission unit 803 is transmitted as an output from the OFDM signal generation unit 208 from transmit antenna 209 of FIG. 2.

Figure 9:
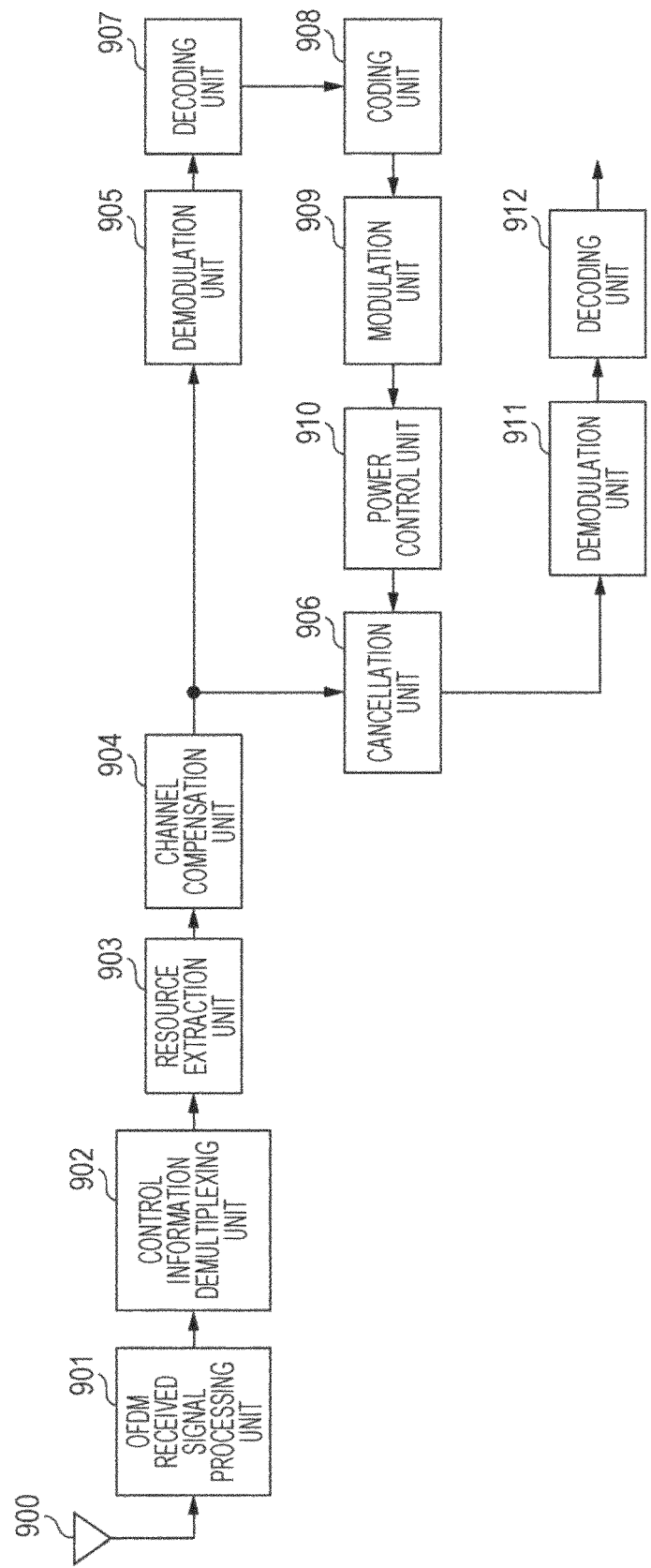
FIG. 9 is a diagram depicting one example of the structure of a receiver of a terminal apparatus using SIC.
Figure 10:
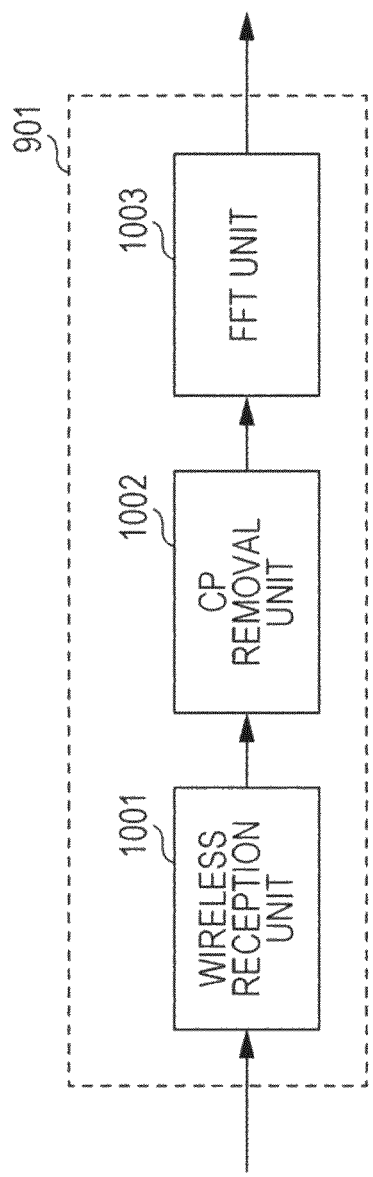
FIG. 10 is a diagram depicting one example of OFDM received signal process.

A conventional example of the structure of a receiver of the terminal apparatus 102 which receives a signal subjected to DL-NOMA is depicted in FIG. 9. A signal received via a receive antenna 900 is inputted to an OFDM received signal processing unit 901. One example of the structure of the OFDM received signal processing unit 901 is depicted in FIG. 10. The signal received at the receive antenna 900 is inputted to a wireless reception unit 1001, where process such as down conversion, filtering, A/D conversion, or the like is performed. An output from the wireless reception unit 1001 is inputted to a CP removal unit 1002, where the CP inserted on a transmission side is removed. An output from the CP removal unit 1002 is inputted to an FFT unit 1003, where transformation from the time domain signal to a frequency domain signal is performed by FFT. An output from the FFT unit 1003 is inputted to a control information demultiplexing unit 902 of FIG. 9. At the control information demultiplexing unit 902, of the received signal, the control information is demultiplexed. The acquired control information (such as MCS and assignment information) is used for reception process at a later stage. A signal other than the control information is inputted to a resource extraction unit 903. At the resource extraction unit 903, a resource (sub-carrier) to which a signal to the terminal apparatus 102 is mapped is extracted. Note that information for resource extraction is included in the control information acquired at the control information demultiplexing unit or control information separately notified from a higher layer.

An output from the resource extraction unit 903 is inputted to a channel compensation unit 904. At the channel compensation unit 904, channel estimation is performed with a demodulation reference signal (DMRS), cell-specific reference signal (CRS), or the like transmitted from the base station apparatus together with data signal to compensate for influences received on a propagation channel (channel) by using the acquired channel estimation value. An output from the channel compensation unit 904 is inputted to a demodulation unit 905 and a cancellation unit 906. At the demodulation unit 905, demodulation is performed by the modulation scheme used at the terminal 101. Note that, as described above, the terminal apparatus 102 has been notified of the MCS of the terminal apparatus 103.

An output from the demodulation unit 905 is inputted to a decoding unit 907, where decoding is performed based on information about the MOS of the terminal apparatus 103. An information bit sequence to the terminal apparatus 103 acquired by decoding is inputted to a coding unit 908 for re-coding. Here, a coding rate is determined based on the information about the MCS of the terminal apparatus 103. That is, at the coding unit 908, process similar to that of the coding unit 201-1 of FIG. 2 is performed. An output from the coding unit 908 is inputted to a modulation unit 909, where modulation is performed based on the information about the MCS of the signal to the terminal apparatus 103. That is, at the modulation unit 909, process similar to that of the modulation unit 202-2 of FIG. 2 is performed. An output from the modulation unit 909 is inputted to a power assignment unit 910. Here, a control value at the power assignment unit 910 may be notified from the base station apparatus 101 or may be estimated from a reference signal such as DMRS or CRS.

An output from the power assignment unit 910 is inputted to the cancellation unit 906. In the cancellation unit 906, from the signal inputted from the channel compensation unit 904, a signal to the terminal apparatus 103 outputted from the power assignment unit 910 is subtracted (cancelled), thereby acquiring a modulation symbol to the terminal apparatus 102. An output from the cancellation unit 906 is inputted to a demodulation unit 911, where demodulation is performed based on the MCS of the terminal apparatus 102. By applying, at the decoding unit 912, error correction decoding to an output from the demodulation unit 911, an information bit sequence to the terminal apparatus 102 is acquired.

In this manner, in the conventional DL-NOMA system, the terminal apparatus in which cancellation of a signal to another terminal apparatus is assumed has to be notified, by the base station apparatus, of the MCS for use by the other terminal apparatus for communication. As a matter of course, since the types of MCS have a limitation, it is also possible to consider a try-out of all MCSs of the other terminal apparatus. However, in consideration of decoding process, the amount of calculation becomes enormous, and this is not practical.

Figure 11:
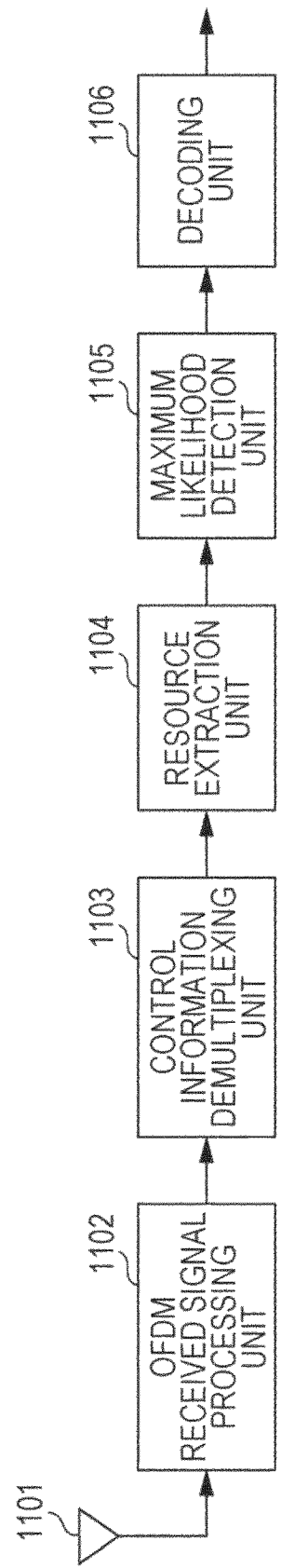
FIG. 11 is a diagram depicting one example of the structure of a receiver of a terminal apparatus using maximum likelihood detection.

Thus, in the present embodiment, the structure of a receiver is used in which maximum likelihood detection (MLD) is used for signal demultiplexing at the receiver and the signal to the other terminal is not decoded. One example of the structure of a receiver in the present embodiment is depicted in FIG. 11. Since processes until the output from a resource assignment unit 1104 is acquired are similar to those depicted in FIG. 9, description of the processes is omitted.

Figure 12:
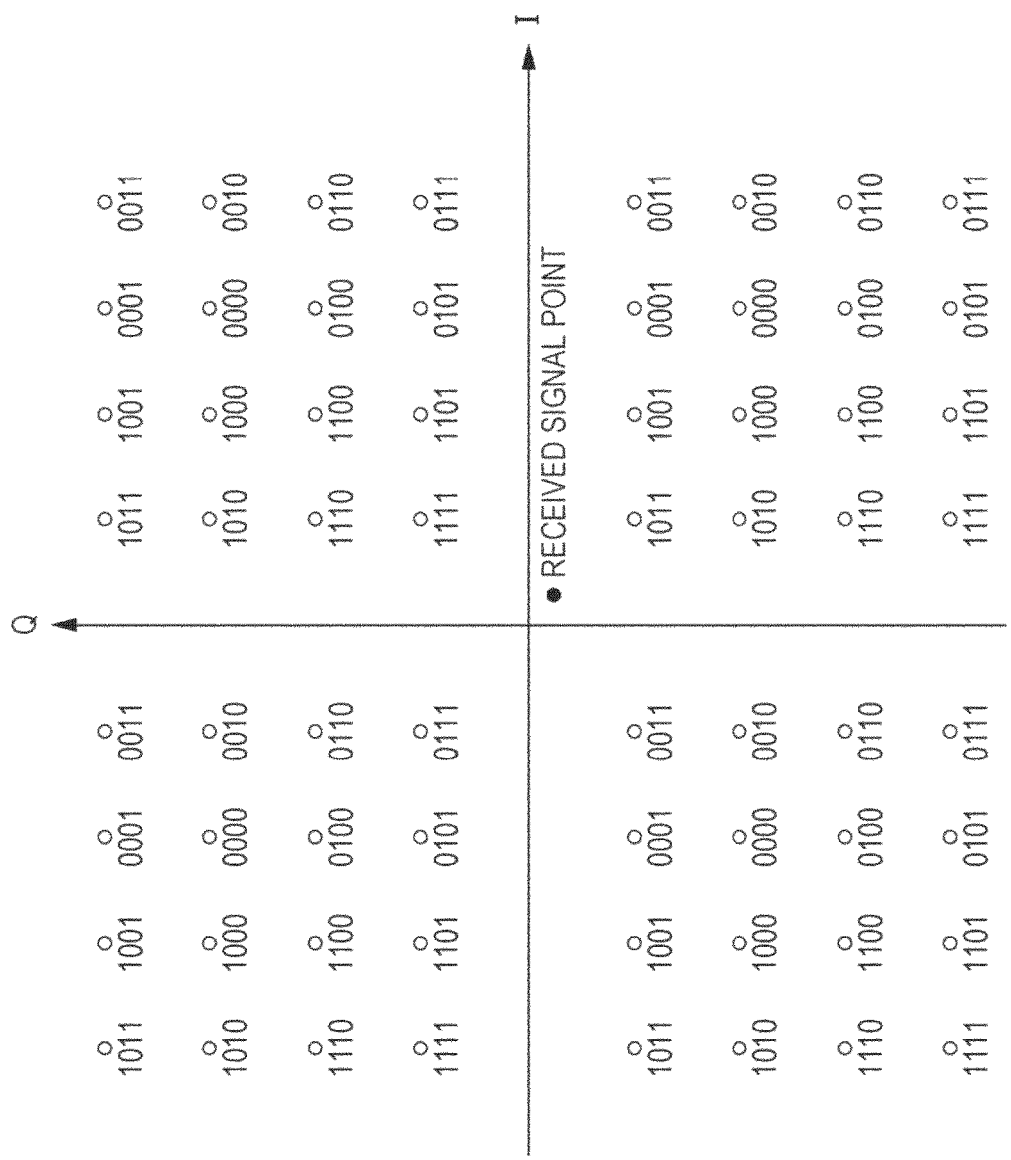
FIG. 12 is a diagram depicting a received signal point in DL-SOMA.

A maximum likelihood detection unit 1105 first compensates for influences of the channel. In general, as channel compensation, a reference signal (such as CRS or DMRS described above), which is a known signal, is transmitted from a transmission apparatus, and a channel is estimated at reception for channel estimation. Based on the acquired channel estimation value, channel compensation is performed. By way of example, when the received signal point after channel compensation is performed is at a position in FIG. 12, the maximum likelihood detection unit 1105 performs the subsequent signal processing by assuming that, among candidate points, a candidate point "1011" at the shortest distance to the received signal point has been transmitted. Here, to generate hollow transmission candidate points of FIG. 12, only the modulation scheme used for the signal to a local station and the modulation scheme used for the signal to another terminal apparatus subjected to non-orthogonal multiplexing are required. That is, to decode the signal to the other signal, the coding rate and the assignment information of the other signal are not required in the structure of the receiver in the present invention. Also, the control information may be notified with a frame (subframe) where the data transmission is being performed, or may be notified in advance by a higher layer (for example, radio resource control (RRC)). Furthermore, while a hard decision that "1110", which is a point closest to the received signal point, has been transmitted is described in the above description, a soft decision is performed for each bit for output of a bit log likelihood ratio (LLR) or the like In this manner, according to the present embodiment, by using MLD for signal detection of the receiver, the signal to the other terminal does not have to be decoded. Therefore, decoding of the signal to the local station can be made even without the limitation that the same resource assignment is performed on terminal apparatuses joining non-orthogonal multi-access or notification of the MCS and the assignment information of the signal to the other terminal. That is, without significantly increasing control information, non-orthogonal multiplexing can be performed independently of assignment of the other terminal. As a result, an increase in the number of terminals performing non-orthogonal multi-access can be addressed, each terminal can perform transmission by appropriate resource assignment, and therefore throughput can be increased.

Second Embodiment

Figure 13:
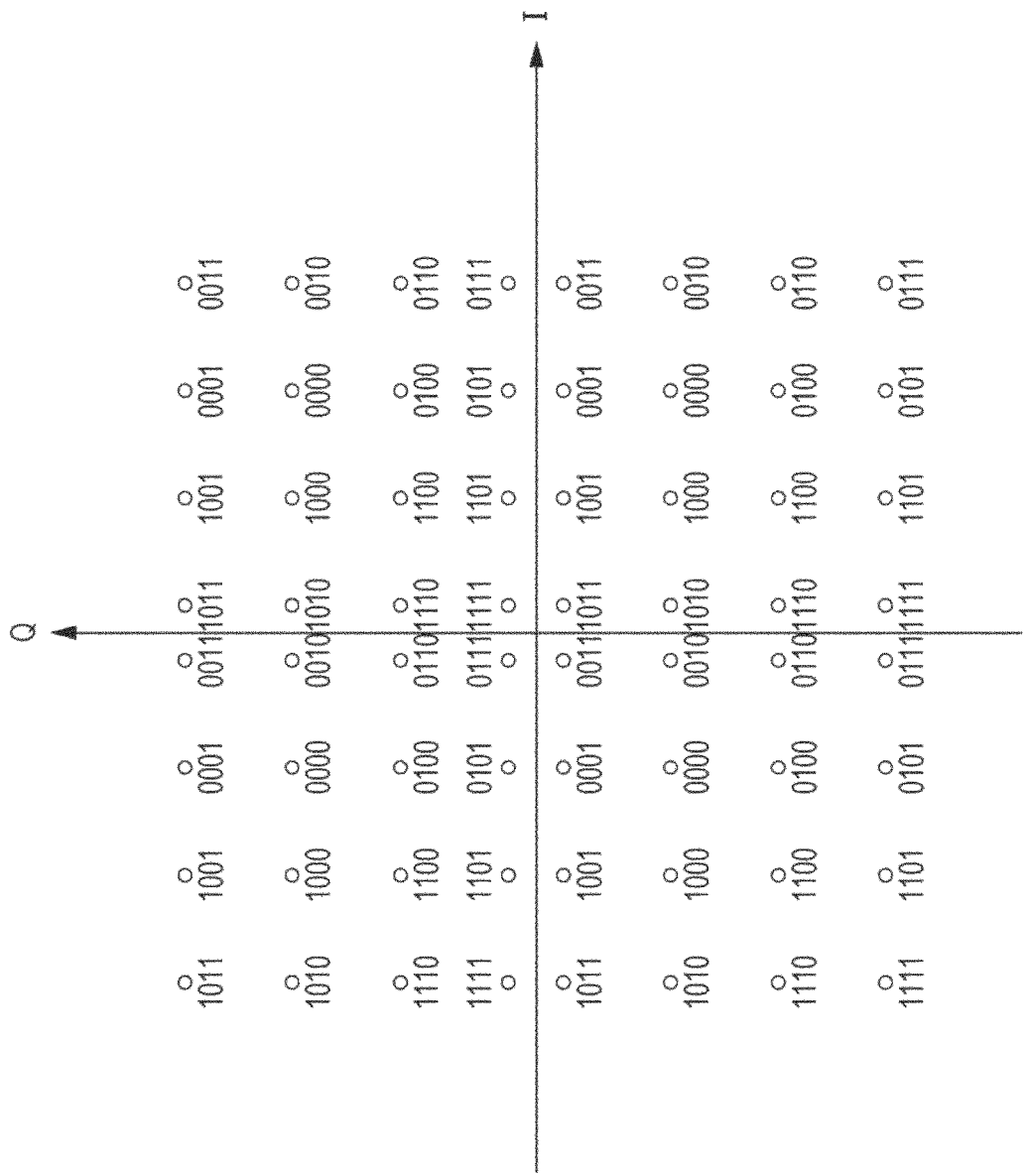
FIG. 13 is a diagram depicting a received signal point in DL-NOMA when a power difference is small.

In the first embodiment, it has been described that resource assignment can be flexibly performed by using maximum likelihood detection (MLD). By using MLD, even if non-orthogonal multiplexing is performed, the signal to the local station can be decoded without decoding of the signal to the other terminal. However, when a power difference is large in power assignment to a plurality of terminals performing non-orthogonal multiplexing, as depicted in FIG. 7, a distance between signal points due to different transmission bits of the signal to the other station is longer compared with a distance between signal points due to different transmission bits to the local station. That is, it is possible to detect a signal to the local station as being relatively less prone to receive influences by non-orthogonal multiplexing. However, when a power difference is small in power assignment to a plurality of terminals performing non-orthogonal multiplexing, as depicted in FIG. 13, the distance between signal points due to different transmission bits of the signal to the other station is shorter compared with the distance between signal points due to different transmission bits to the local station. That is, influences by non-orthogonal multiplexing become dominant, disabling detection of the signal to the local station. In the present embodiment, a method of keeping high detection accuracy even if the power difference in non-orthogonal multiplexing is small is described.

Figure 14:
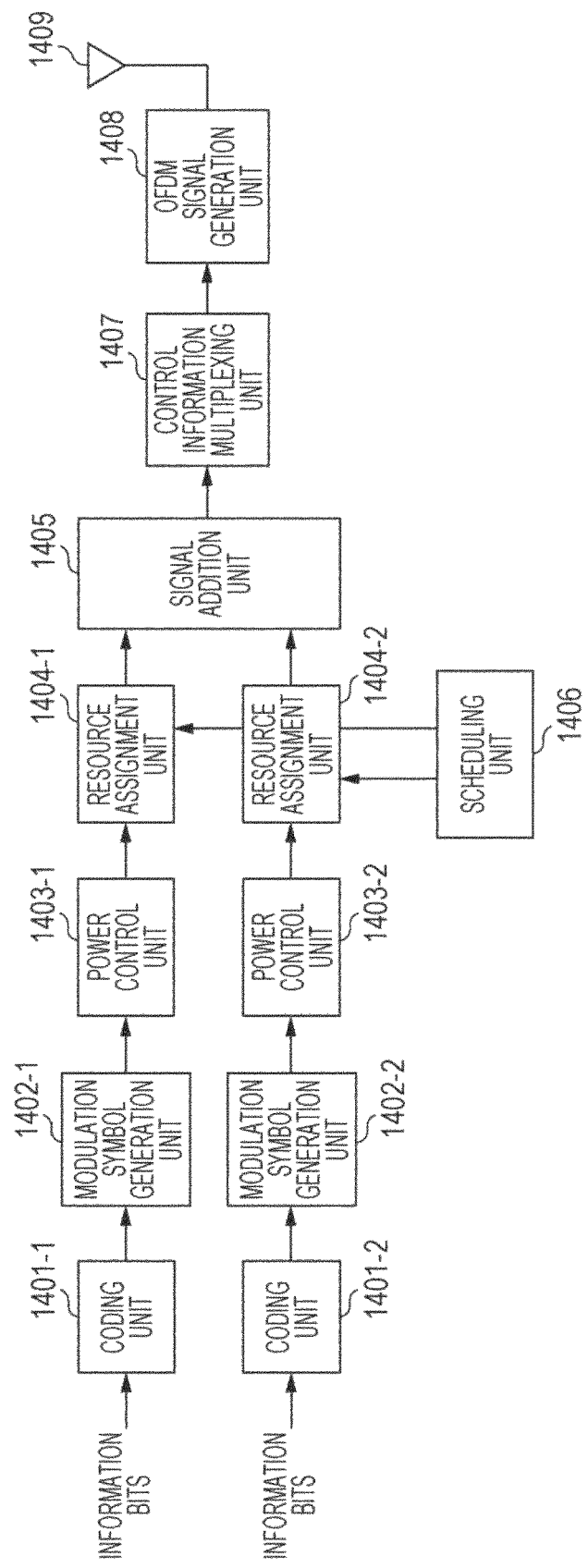
FIG. 14 is a diagram depicting one example of the structure of a transmitter of a base station apparatus according to a second embodiment.

The structure of a transmitter in the present embodiment is depicted in FIG. 14. FIG. 14 depicts a structure approximately similar to that of FIG. 2, but is different in that the modulation unit 202-1 and the modulation unit 202-2 are changed to a modulation symbol generation unit 1402-1 and a modulation symbol generation unit 1402-2. In the following, the process of the modulation symbol generation unit 1402-1 and the modulation symbol generation unit 1402-2 is described. For example, when the modulation scheme for use at the modulation symbol generation unit 1402-1 is 16 QAM and the modulation scheme for use at the modulation symbol generation unit 1402-2 is QPSK, signal point candidates outputted from a signal addition unit 1405 are as in FIG. 15. Since the base station apparatus 101 can grasp a bit sequence inputted to the modulation symbol generation unit 1402-2, the modulation symbol generation unit 1402-1 changes mapping or labeling at the modulation symbol generation unit 1402-1 by the bit sequence. In other words, while the modulation symbol generation unit 1402-1 conventionally performs fixed mapping irrespectively of the bit sequence inputted to the modulation symbol generation unit 1402-2, the modulation symbol generation unit 1402-1 of the present embodiment changes mapping by the signal to the other signal. In FIG. 15, the modulation symbol generation unit 1402-1 and the modulation symbol generation unit 1402-2 perform labeling to each signal point so that the signal after non-orthogonal multiplexing is line-symmetric to the axis and the Q axis with reference to mapping of 16 QAM in the first quadrant. With this, the power difference is small between signals where non-orthogonal multiplexing is performed. When the structure becomes as in FIG. 14, an adjacent signal candidate point can also be regarded as the same signal point for the terminal apparatus having 16 QAM transmitted thereto. Therefore, bit error or symbol error can be made less prone to occur.

In the above example, description has been made to the case in which a certain degree of power difference is present and 16 QAM and QPSK are subjected to non-orthogonal multiplexing. In the following, process at the modulation symbol generation unit 1402-1 in a generalized case is described. The modulation symbol generation unit 1402-1 changes mapping based on a bit sequence configuring a modulation symbol at the modulation symbol generation unit 1402-2. Specifically, when the exclusive OR of odd-numbered bits (first, third, and fifth for a modulation symbol configured of six bits) in a bit sequence is calculated, the bit sequence configuring the modulation symbol outputted from modulation symbol generation unit 1402-2, and the exclusive OR is 0, the modulation symbol generation unit 1402-1 performs process similar to that of the conventional modulation unit (the modulation unit 202-1 of FIG. 2). On the other hand, when the exclusive OR is 1, the modulation symbol generation unit 1402-1 generates a modulation symbol as conventional, and then performs process of inverting a code on the I axis. Also, when the exclusive OR of even-numbered bits (second, fourth, and sixth for a modulation symbol configured of six bits) is calculated and the exclusive OR is 0, the modulation symbol generation unit 1402-1 performs process as conventional (the modulation unit 202-1 of FIG. 2). On the other hand, when the exclusive OR is 1, the modulation symbol generation unit 1402-1 generates a modulation symbol as conventional, and then performs process of inverting a code on the Q axis. By performing this process, even if any QAM is used at the modulation symbol generation unit 1402-2 in the signal after non-orthogonal multiplexing, points configured of the same bit sequence can be made adjacent to each other. Note that while description has been made in which division is made into odd-numbered bits and even-numbered bits, this assumes labeling of QAM (QPSK, 16 QAM, 64 QAM) for use in LTE. When labeling different from LTE is performed, division into odd-numbered bits and even-numbered bits may not be appropriate. By dividing of a bit sequence into a former half and a latter half and labeling of QAM such as making a positive-negative decision on the I axis and the Q axis based on each exclusive OR, a reference for sign inversion is decided.

Note that the above-described modulation scheme can be applied not only to QAM but also to BPSK. Since binary phase shift keying (BPSK) does not have orthogonal components (values on the Q axis), the above-described method is applied only to in-phase components (values on the I axis).

Next, one example of the structure of a receiver in the present embodiment is depicted in FIG. 11. The structure of the receiver in the present embodiment is approximately similar to that of the first embodiment, but is different in the process at the maximum likelihood detection unit 1105. At the maximum likelihood detection unit 1105 according to the present embodiment, based on the modulation scheme to be used for the signal to the local station and the modulation scheme to be used for the signal to the other station and a power difference therebetween, transmission signal candidate points as in FIG. 15 are generated, and a candidate point at the closest distance from the received signal point is calculated as a transmit signal point. This is an example when a hard decision is made. As with the first embodiment, however, a soft decision may be performed to calculate a bit LLR.

In the conventional technology, when a transmit power difference is small, it is decided that a different transmit signal point has been transmitted even with relatively small noise. According to the present invention, however, since an adjacent signal point can be taken as the same signal point for the local station, probability of causing decision error due to noise or interference can be decreased. Also, in the conventional mapping scheme (Gray coding), an adjacent bit is a signal point different by one bit, and a further adjacent signal point is a signal point different by two bits. According to the present invention, however, by performing the process at the modulation symbol generation unit, mapping can be made in a manner such that a signal adjacent to an adjacent signal point is different only by one bit, thereby allowing a bit error rate to be decreased. That is, the bit error rate can be reduced even if relatively large noise occurs.

Note that while it is assumed that maximum likelihood detection is performed as process at the receiver in the present embodiment, not only maximum likelihood but also any can be effective as a detection method. For example, it is also effective when a replica is generated based on a soft decision result in a symbol level interference canceller or an interference canceller of a code word level.

Note that a program operating on the base station apparatus and the terminal apparatus according to the present embodiment is a program which controls a CPU and so forth so as to achieve the functions of the above-described embodiments regarding the present invention. And, information handled in these apparatuses is temporarily accumulated in a RAM at the time of processing thereof, then stored in various ROMs and HDDs, and read by the CPU as required for correction and writing. As a recording medium which stores the program, any of semiconductor media (for example, ROM, non-volatile memory card, and so forth), optical recording media (for example, DVD, MO, MD, CD, BD, and so forth), magnetic recording media (for example, magnetic tape, flexible disc, and so forth), and so forth may suffice. Also, the functions of the above-described embodiments are achieved not only by executing the loaded program. Based on an instruction of that program, the functions of the present invention may be achieved also by processing in association with an operating system, another application program, or the like.

Also, for distribution to the market, the program can be stored in a portable recording medium for distribution, or can be transferred to a server computer connected via a network such as the Internet. In this case, a storage apparatus of the server computer is also included in the present invention. Also, an entire or part of the terminal apparatus and the base station apparatus in the above-described embodiments may be achieved as, typically, an LSI, which is an integrated circuit. Function blocks of the reception apparatus may be each made individually into a chip, or an entire or part thereof may be integrated into a chip. When each of the function blocks is made into an integrated circuit, an integrated circuit control unit which controls those is added.

Also, a circuit integration scheme is not restricted to LSI, but circuit integration may be achieved by a dedicated circuit or a general-purpose processor. Also, if a circuit integration technique as an alternative to LSI emerges with the advance of semiconductor technology, an integrated circuit by that technique can be used.

Note that the invention of the present application is not restricted to the above-described embodiments. It goes without saying that the terminal apparatus of the invention of the present application is not restricted to be applied to a mobile station apparatus and can be applied to stationary-type or non-movable-type electronic devices installed indoors or outdoors, for example, AV devices, kitchen devices, cleaning/washing devices, air conditioners, office devices, automatic vending machines, and other home devices.

In the foregoing, while the embodiments of this invention have been described in detail with reference to the drawings, a specific structure is not meant to be restricted to these embodiments, and designs and others in a range not deviating from the gist of this invention can also be included in the scope of claims.

INDUSTRIAL APPLICABILITY

The present invention is suitable for use in a terminal apparatus, base station apparatus, communication system, and communication method.

Note that the present international application claims priority based on Japanese Patent Application. No. 2015-004610 filed on Jan. 14, 2015, and the entire contents of Japanese Patent Application No. 2015-004610 are incorporated in the present international application.

REFERENCE SIGNS LIST 101 base station apparatus
102, 103 terminal apparatus
201-1 to 201-2 coding unit
202-1 to 202-2 modulation unit
203-1 to 203-2 power assignment unit
204-1 to 204-2 resource assignment unit
205 signal addition unit
206 scheduling unit
207 control information multiplexing unit
208 OFDM signal generation unit
209 transmit antenna
801 IFFT unit
802 CP attachment unit
803 wireless transmission unit
900 receive antenna
901 OFDM received signal processing unit
902 control information demultiplexing unit
903 resource extraction unit
904 channel compensation unit
905 demodulation unit
906 cancellation unit
907 decoding unit
908 coding unit
909 modulation unit
910 power assignment unit
911 demodulation unit
912 decoding unit
1001 wireless reception unit
1002 CP removal unit
1003 FFT unit
1101 receive antenna
1102 OFDM received signal processing unit
1103 control information demultiplexing unit
1104 resource extraction unit
1105 maximum likelihood detection unit
1106 decoding unit
1401-1 to 1401-2 coding unit
1402-1 to 1402-2 modulation symbol generation unit
1403-1 to 1403-2 power assignment unit
1404-1 to 1404-2 resource assignment unit
1405 signal addition unit
1406 scheduling unit
1407 control information multiplexing unit
1408 OFDM signal generation unit
1409 transmit antenna

The invention claimed is:

1. A base station apparatus comprising:
modulation circuitry which produces modulation symbols; and
signal addition circuitry which adds, to the modulation symbols, either of values corresponding to power ratios, the values being other than the modulation symbols;
wherein the signal addition circuitry determines signs for a real-part value and an imaginary-part value of the modulation symbols based on a first bit sequence which is independent of a second bit sequence mapped to the modulation symbols.

2. A terminal apparatus comprising:
demodulation circuitry which demodulates modulation symbols;
wherein either of values corresponding to power ratios are added to the modulation symbols, the values being other than the modulation symbols, and
signs for a real-part value and an imaginary-part value of the modulation symbols are determined based on a first bit sequence which is independent of a second bit sequence mapped to the modulation symbols.

3. The base station apparatus according to claim 1, wherein the first bit sequence has a 2-bit length.

4. The terminal apparatus according to claim 2, wherein the first bit sequence has a 2-bit length.

* * * * *